3,376,261
PROCESS FOR PREPARING POLYCARBONATES
Winston J. Jackson, Jr., and John R. Caldwell, Kingsport, Tenn., assignors to Eastman Kodak Company, Rochester, N.Y., a corporation of New Jersey
No Drawing. Continuation-in-part of application Ser. No. 137,973, Sept. 14, 1961. This application Mar. 16, 1966, Ser. No. 534,644
11 Claims. (Cl. 260—47)

This application is a continuation-in-part application of our copending application Ser. No. 137,973, filed Sept. 14, 1961, now abandoned.

This invention relates to a new process for preparing bisphenol polycarbonates by condensation of bisphenols with diacid chlorides. More particularly, the invention relates to improvements of the interfacial polycondensation process wherein the condensation is carried out in a two-phase liquid reaction mixture.

An object of the invention is to provide an improved polymerization process for producing bisphenol polycarbonates. Another object is to provide a method for controlling molecular weight of the product of the improved process. Another object is to provide means for obtaining a bisphenol polycarbonate product as a precipitate from an interfacial polycondensation reaction mixture as the polymer is formed.

Polycarbonates have been prepared by condensing bisphenol with a diacid chloride (phosgene or a diol bischloroformate) using an interfacial polycondensation process in which the bisphenol is dissolved or suspended in the alkaline aqueous phase, and the diacid chloride is dissolved in the organic solvent phase of a two-phase reaction mixture in the presence of a selected catalyst, and the polycondensation reaction proceeds as the reaction mixture is stirred. The polycarbonate product is usually dissolved by the organic solvent phase as the polymerization reaction proceeds. A discussion of interfacial polycondensation methods appears in Soc. of Plastics Engineers Jour. 15, 485–95 (1959).

According to the invention, a surface-active agent and an inert water-immiscible hydrocarbon liquid which is a non-solvent for the polymer are added to the two-phase reaction mixture, causing the polymer to precipitate as the reaction proceeds. By adjusting the concentration of catalyst and the ratio of non-solvent to solvent in the reaction mixture, molecular weight of the product can be controlled more accurately than by previous methods.

According to a process described in German Patent No. 1,046,311, a surface-active agent was added to the ordinary two-phase reaction mixture in which methylene chloride was used as the organic solvent. An organic non-solvent was not used in that process and the polymer did not precipitate but was dissolved in the methylene chloride phase as the reaction proceeded.

The process of the invention provides means for more accurate control of molecular weight of the product and also yields a product in precipitated form. In preferred embodiments of the invention, the precipitate forms as fine granular particles.

In the examples below, tertiary amines were chosen as the catalysts, but it is to be understood that any of the known catalysts for polycarbonate condensation reactions, for instance a quaternary ammonium salt such as triethylbenzylammonium chloride may be used.

Cyclohexane and heptane were chosen as examples of water-immiscible non-solvents for the polymer; however, other water-immiscible inert hydrocarbon liquids which are non-solvents for the polymer being produced may be used.

Some types of surface-active agents which may be used are salts of alkyl sulfates, salts of alkyl sulfonates, salts of alkylated aromatic sulfonic acids, salts of long-chain hydroxyalkylamide sulfates, and polyethyleneoxide derivatives. The amount of surfactant added should be 0.1–5.0 percent by weight, based on the weight of bisphenol added to the reaction mixture.

An advantage of the process of the invention is more accurate control of molecular weight of the product than could be obtained with previous interfacial polycondensation polymerization. Within certain limits, increasing the concentration of catalyst while holding constant the proportions of the other components of the reaction mixture will increase the molecular weight of the product which precipitates as it forms. Experiments indicate that there is a direct linear relation, within certain limits, between the logarithm of catalyst concentration and the inherent viscosity of the product. In Example 1 below, for instance, considering the increase in inherent viscosity as catalysts concentration increases from 1 drop (0.016 g.) to 4 drops, the inherent viscosity increases approximately in direct proportion to the logarithm of catalyst concentration. Beyond these limits, increasing catalyst concentration from 4 to 8 drops, the I.V. increases but the logarithmic relation does not hold.

Molecular weight of the precipitated polymer product also tends to decrease within limits as the ratio of water-immiscible non-solvent to solvent is increased in the reaction mixture. And, within certain limits, there appears to be an approximate inverse linear relation between the logarithm of this ratio and the inherent viscosity. This is demonstrated in Example 2 below. In using the process of the invention for a particular condensation reaction, one can experimentally determine the molecular weights of the products obtained at various catalyst concentrations (or at various non-solvent to solvent ratios) while holding the other factors constant, and then one can select a particular catalyst concentration (or non-solvent:solvent ratio) to obtain a given molecular weight product. Thus, for any given reaction mixture, values can be predetermined for catalyst concentrations and non-solvent/solvent ratios to yield a range of molecular weights. From an equation or graphic plot derived from such predetermined values a precise value can be selected to yield the desired molecular weight product, and the catalyst concentration or non-solvent:solvent ratio of the reaction mixture can be adjusted to the selected value.

From about 1 to about 4 volumes of non-solvent per volume of solvent appears to be the preferred range of non-solvent/solvent ratios. Many polycarbonates can be obtained as particles when cyclohexane is used as the non-solvent, but it is necessary to use an aliphatic hydrocarbon such as hexane or heptane as the non-solvent in order to obtain some polycarbonates as particles. Two of these polymers are illustrated in Examples 6 and 7.

The preferred polymer solvent is methylene chloride, but other satisfactory solvents are ethylene dichloride and chloroform. With some polymers, it is possible to use benzene, toluene, or xylene. The volume (in ml.) of the polymer solvent which is used in the process is normally about 0.3 to about 2.0 times the weight of the bisphenol measured in grams. If too much solvent is used the polymer will not separate as small particles, and if too little is used the polymer yield will be low. A more preferred volume (in ml.) of the polymer solvent which is used in the process is about 0.5 to about 1.2 times the weight of the bisphenol measured in grams.

The surfactant is necessary for obtaining many polycarbonates as small particles instead of as lumps or tacky doughs. If the proper non-solvent is used, some polymers can be obtained as particles without the use of a surfactant. However, appreciably smaller particles are usually obtained when a surfactant is present. It is important to obtain the polymers as small particles (20- to 40-mesh in size) so that they can be effectively washed without the necessity of dissolving them in a solvent. At the completion of the polymerization the mixture is acidified and the particles are collected. They are washed with water and then stirred in hot (70–90° C.) water to remove inorganic salts. A little acetic or other acid should be present to neutralize any alkali which is washed out of the polymer when occluded solvent is driven off by the heat. The particles are then stirred in acetone or isopropanol to remove unreacted bisphenol. It is also necessary to have a small amount of acetic acid to prevent possible coagulation of the particles. Inorganic salts and unreacted bisphenol still occluded inside the particles are removed by stirring with a mixture containing water and a water-immiscible solvent which causes the particles to swell but not coagulate. This process is described in detail in our U.S. Patent 3,213,060, issued Oct. 19, 1965.

This method of preparing polycarbonates as a precipitate has many advantages over the conventional method in which the polymer builds up in the solvent phase of the reaction mixture. The precipitation method requires a considerably smaller amount of solvent volume and reaction mixture volume to prepare a given amount of polymer. The average molecular weight of the polymer can be closely controlled by the method of the invention, whereas it is very difficult to control by the solution method. The washing of polycarbonates prepared by the new method is simple and easy since the polymer is washed as small particles whereas the washing of polycarbonates in solution is more troublesome and difficult. The step of removing the polycarbonates from solution is eliminated. By producing a precipitated product, a continuous polymerization process is made possible.

When the diacid chloride used in the process is phosgene, it should be substantially free of chlorine as an impurity. Otherwise, somewhat crosslinked products may be obtained which are not completely soluble in normal solvents for polycarbonates, such as methylene chloride. It is theorized that the mechanism of such crosslinking perhaps involves oxidation of the phenolic end groups of the polymer by chlorine, free radical formation, and then coupling of these radicals. Applicants do not wish to be bound by any such theory, however.

The following examples illustrate the practice of the invention.

Example 1

To a stirred mixture containing 8.0 g. of sodium hydroxide dissolved in 100 ml. of water, 0.1 g. of sodium aluryl sulfate, 16.9 g. (0.050 mole) of 4,4'-(hexahydro-4,7-methanoindan-5-ylidene)diphenol hydrate, 10 ml. of methylene chloride, 20 ml. of cyclophexane, and the amount of tri-n-butylamine given in the table below was added 6.7 g. of phosgene (measured as the lecture bottle weight loss) while the reaction mixture was held at 15–20° C. by a cold water bath. After addition of the phosgene, the mixture was stirred 20 minutes longer and then acidified with acetic acid. The polymer (tiny white particles) was collected on a filter, washed with water, and then stired in hot water (containing 2 ml. of acetic acid) on the steam bath for one-half hour. After stirring in acetone (containing 1 ml. of acetic acid) at room temperature for one-half hour (to remove unreacted diphenol), the polymer was stirred for 2 hours in a mixture containing 100 ml. of isopropyl acetate, 100 ml. of water, and 2 ml. of acetic acid. The polycarbonate particles were then dried. Inherent viscosities obtained when various amounts of tri-n-butylamine cataylst were added are given in the following table. One drop weighs 0.016 g. All inherent viscosities were determined in chloroform.

| Catalyst (drops): | I.V. |
|---|---|
| 1 | 0.6 |
| 2 | 1.4 |
| 4 | 2.2 |
| 8 | 2.5 |

Inherent viscosity between 0.6 and 1.4 (requiring between 1 and 2 drops of catalyst) can be obtained by diluting the catalyst with a solvent such as methylene chloride or ethylene dichloride and adding the required amount.

Example 2

The procedure of Example 1 was repeated, using 2 drops of tri-n-butylamine catalyst while the amounts of cyclohexane were varied:

| $CH_2Cl_2$ (ml.) | $C_6H_{12}$ (ml.) | Ratio Non-Solvent/Solvent | I.V. |
|---|---|---|---|
| 10 | 40 | 4:1 | 0.5 |
| 10 | 20 | 2:1 | 1.4 |
| 10 | 10 | 1:1 | 2.0 |

Example 3

The procedure of Example 1 was repeated using 2 drops of tri-n-butylamine and the sodium lauryl sulfate was omitted. The polymer became a viscous doughy mass before all of the phosgene was added.

Example 4

The procedure of Example 1 was repeated using 2 drops of catalyst, and 0.1 g. of sodium dodecylbenzene sulfonate was added instead of sodium lauryl sulfate. The polymer became a viscous doughy mass. When 1.0 g. of sodium dodecylbenzene sulfonate was added instead of 0.1 g., the polymer formed as small particles.

Example 5

A polycarbonate was prepared from Bisphenol A (4,4'-isopropylidene diphenol). The general method of Example 1 was followed, and the volume of solvent (in milliliters) was 0.9 the weight of the bisphenol measured in grams. The amounts of the compounds used were as follows: 11.4 g. (0.050 mole) of Bisphenol A, 6.5 g. of sodium hydroxide, 100 ml. of water, 0.1 g. of sodium lauryl sulfate, 10 ml. of methylene chloride, 20 ml. of cyclohexane, 4 drops of tri-n-butylamine, and 6.5 g. of phosgene. The polymer particles (20–40-mesh in size) had an inherent viscosity of 0.6.

The polycarbonates of Bisphenol A and of 4,4'-(hexahydro-4,7-methanoindan-5-ylidene)diphenol were prepared using heptane as the non-solvent. Generally smaller particle size was obtained using aliphatic hydrocarbon non-solvents; however, it is necessary to add appreciably more catalyst to obtain a given polymer inherent viscosity when using aliphatic hydrocarbons as when using cyclohexane, but this is no disadvantage.

Example 6

A polycarbonate was prepared from 14.0 g. (0.050 mole) of 4,4'-(2-norborynlidene)diphenol using the procedure of Example 1 but using 0.4 g. of sodium lauryl sulfate instead of 0.1 g., and heptane non-solvent instead of cyclohexane. The polymer particles (40-mesh in size) were washed with isopropanol instead of acetone, because acetone causes these particles to coalesce into an elastic mass. When 10 drops of catalyst was used, an inherent viscosity of 1.2 was obtained. When cyclohexane was used as a non-solvent, the polymer was obtained as a tacky dough instead of tiny particles.

Example 7

A polycarbonate was prepared from 15.4 g. (0.050 mole) of 4,4'-(3-methyl-2-norbornylmethylene)diphenol by the procedure of Example 1, using the modifications in Example 6. Polymer particles (60-mesh in size) had an inherent viscosity of 1.3. When only 5 drops of catalyst was added, the inherent viscosity was 0.5. When cyclohexane was used as the non-solvent instead of heptane, the polymer was obtained as a tacky dough instead of tiny particles.

Example 8

A polycarbonate was prepared wherein the volume (in milliliters) of the solvent (toluene) was 1.2 times the weight of the bisphenol measured in grams. The polymer was prepared by the procedure of Example 1 using the following components: 16.9 g. (0.050 mole) of 4,4'-hexahydro-4,7-methanoindan-5-ylidene)diphenol hydrate, 8.0 g. of sodium hydroxide, 100 ml. of water, 0.2 g. of sodium lauryl sulfate, 20 ml. of toluene, 50 ml. of heptane, 6 drops of triisoamylamine, and 6.7 g. of phosgene. The polymer particles (20-mesh in size) had an inherent viscosity of 0.7.

The above examples are given to illustrate specific embodiments of the invention and are not to be construed as limiting the scope of the invention as defined in the following claims.

We claim:

1. In the process for preparing a polycarbonate by condensation of a bisphenol with a diacid chloride wherein two liquid phases of a reaction mixture comprising (1) an alkaline aqueous phase containing a bisphenol and (2) a water-immiscible organic solvent phase containing a diacid chloride, are intimately contacted and an interfacial polycondensation reaction proceeds, the improvement consisting of having in the reaction mixture (A) from 0.1 to 5.0 weight percent, based on the bisphenol weight, of a surface-active agent, (B) an amount measured in milliliters of said solvent which is about 0.3 to about 2.0 times the weight of said bisphenol measured in grams, and (C) from about 1 to about 4 volumes per volume of said organic solvent of an inert water-immiscible hydrocarbon liquid non-solvent for the polymer, whereby the polymer forms as a precipitated solid as the reaction proceeds.

2. The process of claim 1 wherein said solvent is present in an amount measured in milliliters of about 0.5 to about 1.2 times the weight of said bisphenol measured in grams.

3. The process of claim 1 wherein said surface-active agent is selected from the group consisting of salts of alkyl sulfates, salts of alkyl sulfonates, salts of alkylated aromatic sulfonic acids, salts of long-chain hydroxyalkylamide sulfates, and polyethylene oxide derivatives.

4. The process of claim 2 wherein said surface-active agent is selected from the group consisting of salts of alkyl sulfates, salts of alkyl sulfonates, salts of alkylated aromatic sulfonic acids, salts of long-chain hydroxyalkylamide sulfates, and polyethylene oxide derivatives.

5. The process of claim 3 wherein said diacid chloride is phosgene.

6. The process of claim 4 wherein said diacid chloride is phosgene.

7. The process of claim 6 wherein said bisphenol is 4,4' - (hexahydro-4,7-methanoindan-5-ylidene) diphenol, said water-immiscible solvent is methylene chloride, said surface-active agent is sodium lauryl sulfate, and said hydrocarbon non-solvent is cyclohexane.

8. The process of claim 6 wherein said bisphenol is 4,4'-(hexahydro-4,7-methanoindan - 5 - ylidene) diphenol, said water-immiscible solvent is methylene chloride, said surface-active agent is sodium dodecylbenzene sulfonate and said hydrocarbon non-solvent is cyclohexane.

9. The process of claim 6 wherein said bisphenol is 4,4'-isopropylidene diphenol, said water-immiscible solvent is methylene chloride, said surface-active agent is sodium lauryl sulfate, and said hydrocarbon non-solvent is cyclohexane.

10. The process of claim 6 wherein said bisphenol is 4,4'-(2-norbornylidene) diphenol, said water-immiscible solvent is methylene chloride, said surface-active agent is sodium lauryl sulfate, and said hydrocarbon non-solvent is heptane.

11. The process of claim 6 wherein said bisphenol is 4,4' - (3-methyl-2-norbornylmethylene) diphenol, said water-immiscible solvent is methylene chloride, said surface-active agent is sodium lauryl sulfate, and said hydrocarbon non-solvent is heptane.

References Cited

UNITED STATES PATENTS 2,964,797 12/1960 Pailstocker et al. ----- 260—47
3,240,755 3/1966 Cawthon et al. ------ 260—47

OTHER REFERENCES

Bottenburch: German application 1,046,311, printed Dec. 11, 1958 (Kl. 39c 16).

SAMUEL H. BLECH, *Primary Examiner.*